United States Patent
Arnold

(10) Patent No.: US 7,905,315 B2
(45) Date of Patent: Mar. 15, 2011

(54) VEHICLES HAVING EXHAUST PIPE EXTENDING THROUGH SPACE BETWEEN CYLINDER HOUSINGS OF ENGINE

(75) Inventor: David W. Arnold, Glendale, CA (US)

(73) Assignee: Honda Motor Company, Ltd., Tokyo (JP)

(*) Notice: Subject to any disclaimer, the term of this patent is extended or adjusted under 35 U.S.C. 154(b) by 175 days.

(21) Appl. No.: 12/179,028

(22) Filed: Jul. 24, 2008

(65) Prior Publication Data

US 2010/0018792 A1 Jan. 28, 2010

(51) Int. Cl.
*B60K 13/04* (2006.01)

(52) U.S. Cl. ....... 180/309; 180/89.2; 180/219; 180/296; 180/225; 60/324; 60/313; 60/312

(58) Field of Classification Search .................. 180/309, 180/25, 89.2, 219, 296, 225; 60/324, 313, 60/312

See application file for complete search history.

(56) References Cited

U.S. PATENT DOCUMENTS

| | | | |
|---|---|---|---|
| 4,342,195 A | 8/1982 | Lo | |
| 4,359,865 A | 11/1982 | Nakao et al. | |
| 4,662,173 A | 5/1987 | Wilkinson | |
| 4,903,483 A * | 2/1990 | Atsuumi et al. | 60/313 |
| 5,327,722 A | 7/1994 | Clegg et al. | |
| 6,804,955 B2 | 10/2004 | Bassani | |
| 7,051,824 B1 * | 5/2006 | Jones et al. | 180/68.3 |
| 7,347,045 B2 * | 3/2008 | Bozmoski et al. | 60/312 |
| 2004/0031631 A1 | 2/2004 | Pichler et al. | |
| 2005/0081516 A1 | 4/2005 | Inaoka et al. | |
| 2010/0018792 A1 * | 1/2010 | Arnold | 180/219 |

* cited by examiner

*Primary Examiner* — Paul N Dickson
*Assistant Examiner* — Marlon A Arce
(74) *Attorney, Agent, or Firm* — Ulmer & Berne LLP

(57) ABSTRACT

A vehicle, such as a motorcycle, includes an engine having first and second cylinder housings arranged in a V-shape such that a space is defined between the first and second cylinder housings. The first cylinder housing includes a first exhaust port and the second cylinder housing includes a second exhaust port. A first exhaust pipe is attached to the first exhaust port and is configured to facilitate passage of exhaust fluid from the first cylinder housing and toward a muffler. A second exhaust pipe is attached to the second exhaust port and is configured to facilitate passage of exhaust fluid from the second cylinder housing and toward the muffler. The second exhaust pipe extends through the space.

24 Claims, 2 Drawing Sheets

VEHICLES HAVING EXHAUST PIPE EXTENDING THROUGH SPACE BETWEEN CYLINDER HOUSINGS OF ENGINE

TECHNICAL FIELD

A vehicle, such as a motorcycle, includes an exhaust pipe extending through a space defined between respective cylinder housings of an engine.

BACKGROUND

On a motorcycle having a multi-piston engine, when joining exhaust ports of multiple cylinder housings into a single exhaust pipe and/or muffler, in order to achieve optimal acoustic characteristics, it is generally desirable that the flow distances be equal from each exhaust port to the entrance to the single exhaust pipe and/or muffler. However, it is often difficult to implement such an exhaust configuration upon a motorcycle without adversely affecting the appearance and/or bulk of the motorcycle.

SUMMARY

In accordance with one embodiment, a vehicle comprises an engine, a muffler, a first exhaust pipe, and a second exhaust pipe. The engine comprises a first cylinder housing, a second cylinder housing, and a crankshaft. The crankshaft has a rotational axis. The first cylinder housing comprises a first exhaust port. The second cylinder housing comprises a second exhaust port. The first cylinder housing and the second cylinder housing are arranged in a V-shape such that a space is defined between the first cylinder housing and the second cylinder housing. The first exhaust pipe is attached to the first exhaust port and is configured to facilitate passage of exhaust fluid from the first cylinder housing and toward the muffler. The second exhaust pipe is attached to the second exhaust port and is configured to facilitate passage of exhaust fluid from the second cylinder housing and toward the muffler. The second exhaust pipe extends through the space.

In accordance with another embodiment, a motorcycle comprises an engine, a muffler, a first exhaust pipe, and a second exhaust pipe. The engine comprises a first cylinder housing, a second cylinder housing, and a crankshaft. The crankshaft has a rotational axis. The first cylinder housing comprises a first exhaust port. The second cylinder housing comprises a second exhaust port. The first cylinder housing and the second cylinder housing are arranged in a V-shape such that a space is defined between the first cylinder housing and the second cylinder housing. The first exhaust pipe is attached to the first exhaust port and is configured to facilitate passage of exhaust fluid from the first cylinder housing and toward the muffler. The second exhaust pipe is attached to the second exhaust port and is configured to facilitate passage of exhaust fluid from the second cylinder housing and toward the muffler. The second exhaust pipe extends through the space.

In accordance with yet another embodiment, a motorcycle comprises a frame, a V-twin engine, and an exhaust system. The V-twin engine is supported with respect to the frame and comprises a forward cylinder housing, a rearward cylinder housing, and a crankshaft. The crankshaft has a rotational axis. The forward cylinder housing comprises a forward exhaust port. The rearward cylinder housing comprises a rearward exhaust port. The forward cylinder housing and the rearward cylinder housing are arranged in a V-shape such that a space is defined between the forward cylinder housing and the rearward cylinder housing. The exhaust system is supported with respect to the frame and comprises a muffler, a first exhaust pipe, and a second exhaust pipe. The first exhaust pipe is attached to the forward exhaust port and is configured to facilitate passage of exhaust fluid from the forward cylinder housing and toward the muffler. The second exhaust pipe is attached to the rearward exhaust port and is configured to facilitate passage of exhaust fluid from the rearward cylinder housing and toward the muffler. The first exhaust pipe and the second exhaust pipe have similar flow lengths. An imaginary plane centrally bisects the motorcycle perpendicular to the rotational axis of the crankshaft. The first exhaust port and the second exhaust port are disposed upon opposite sides of the imaginary plane. The second exhaust pipe extends through the space such that respective portions of the second exhaust pipe are disposed upon opposite sides of the imaginary plane.

BRIEF DESCRIPTION OF THE DRAWINGS

It is believed that certain embodiments will be better understood from the following description taken in conjunction with the accompanying drawings in which.

DETAILED DESCRIPTION

Figure 1:
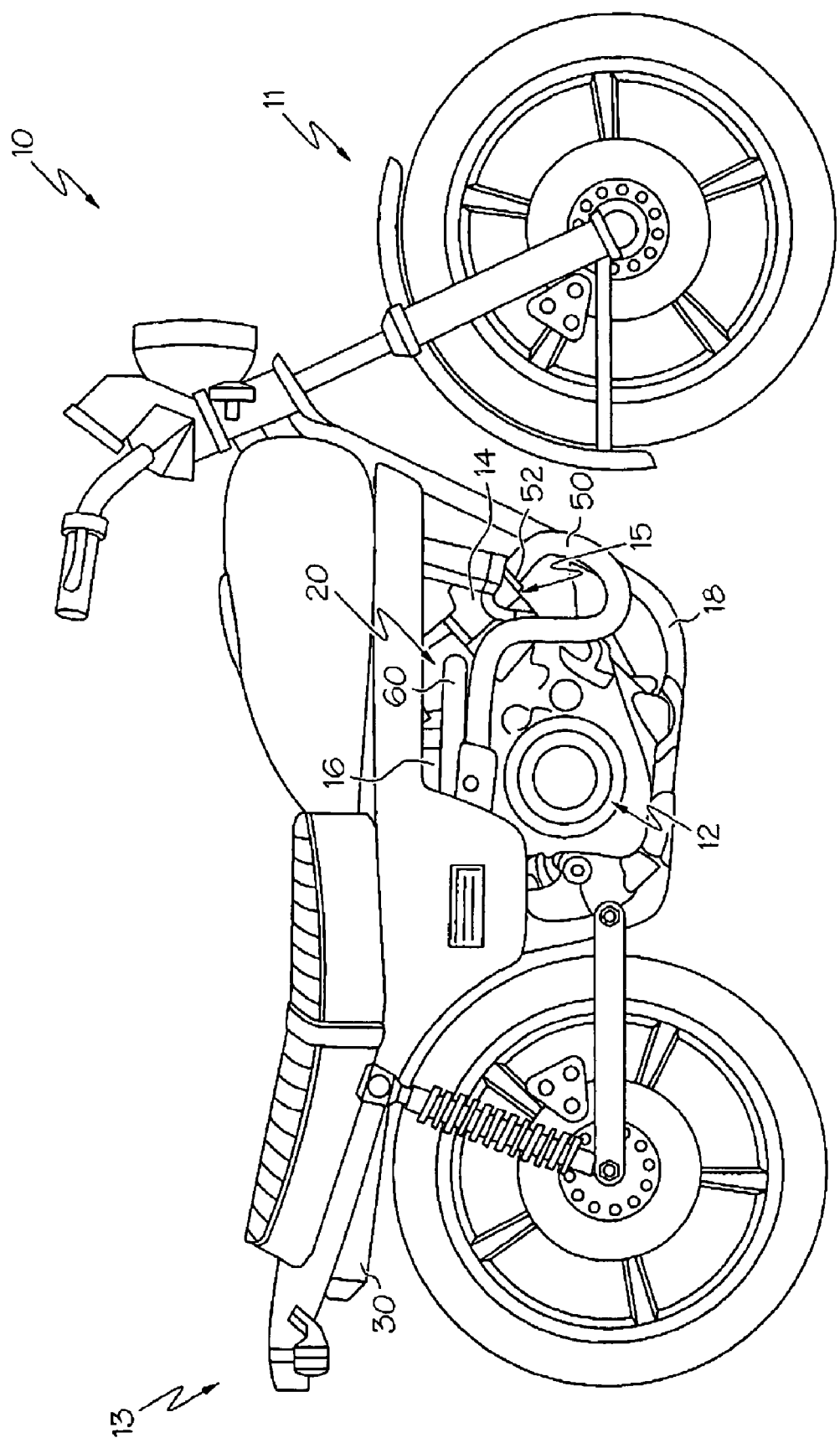
FIG. 1 is a side elevational view of a motorcycle in accordance with one embodiment.

Embodiments are hereinafter described in detail in connection with the views and examples of FIGS. 1-2, wherein like numbers indicate the same or corresponding elements throughout the views. A motorcycle in accordance with one embodiment includes an exhaust system having multiple exhaust pipes connecting an engine to at least one muffler. One such motorcycle 10 is depicted in the example of FIG. 1 to include an engine 12 and an exhaust system which are both supported with respect to a frame 18. In one embodiment, as shown in FIG. 1, the engine 12 can be attached to the frame 18 substantially between a forward end 11 of the motorcycle 10 and a rearward end 13 of the motorcycle 10. However, it will be appreciated that an engine may be attached or otherwise supported with respect to a frame of a motorcycle in any of a variety of alternative configurations.

Figure 2:
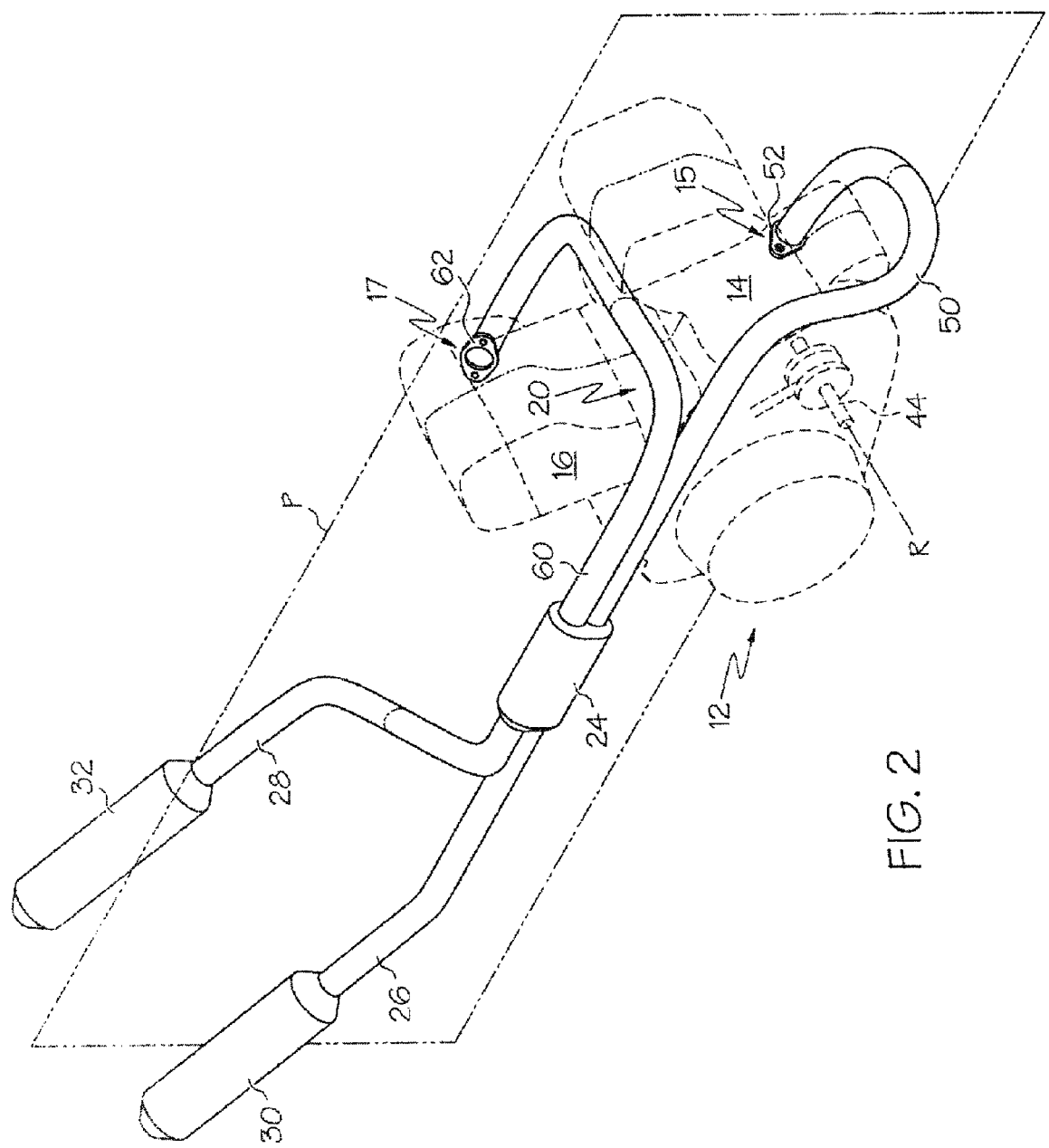
FIG. 2 is a perspective view generally depicting the engine and the exhaust system apart from other components of the motorcycle of FIG. 1.

The engine 12 is shown in FIGS. 1-2 to comprise a V-type internal combustion engine having forward and rearward cylinder housings 14, 16 which are arranged in a V-shape and which are configured to internally support respective pistons of the engine 12 which are also arranged in a V-shape. The engine 12 is also shown in FIG. 2 to include a crankshaft 44 having a rotational axis R. The forward cylinder housing 14 and the rearward cylinder housing 16 are shown to be arranged in a V-shape such that a space 20 is defined between the forward and rearward cylinder housings 14, 16. While the engine 12 is shown to comprise a V-twin engine (i.e., a V-type engine having only two pistons), it will be appreciated that a vehicle in accordance with alternative embodiments can include other types of multi-cylinder engines such as non-V-type engines or V-type engines having more than two pistons. It will be appreciated that the engine 12 can be configured to consume gasoline, diesel fuel, ethanol, kerosene, natural gas, propane, alcohol, jet fuel, hydrogen, and/or any of a variety of other fuels.

Referring again to the engine 12 of FIGS. 1-2, the forward cylinder housing 14 can include a forward exhaust port 15 and the rearward cylinder housing 16 can include a rearward exhaust port 17. In one embodiment, as shown in FIG. 1, the forward cylinder housing 14 can be more closely adjacent than the rearward cylinder housing 16 to the forward end 11 of the motorcycle 10. In another embodiment, as also shown in FIGS. 1-2, the forward exhaust port 15 can be more closely adjacent than the rearward exhaust port 17 to the forward end 11 of the motorcycle 10.

An exhaust system in accordance with one embodiment can comprise any of a variety of combinations of exhaust pipes and one or more mufflers. For example, an exhaust system in accordance with one embodiment can comprise respective exhaust pipes leading from respective cylinder housings of an engine to a common muffler. In another embodiment, an exhaust system can include respective exhaust pipes leading separately from respective cylinder housings of an engine to respective mufflers. In still another embodiment, an exhaust system can include respective exhaust pipes leading from respective cylinder housings to a common exhaust pipe, and then to either a single muffler or to multiple (e.g., two) separate mufflers. An example of this latter arrangement is shown and described with reference to FIGS. 1-2.

In particular, as shown in FIGS. 1-2, an exhaust system can include mufflers 30, 32 and exhaust pipes 24, 26, 28, 50 and 60. The exhaust pipe 50 is shown to be configured to facilitate passage of exhaust fluid from the forward cylinder housing 14 and toward the mufflers 30, 32. It will be appreciated that exhaust fluid can include gases such as carbon monoxide and carbon dioxide, and might additionally or alternatively include liquids such as water. Likewise, the exhaust pipe 60 is shown to be configured to facilitate passage of exhaust fluid from the rearward cylinder housing 16 and toward the mufflers 30, 32. The exhaust pipe 50 is shown to include a flange 52 which is attached to the forward exhaust port 15 of the forward cylinder housing 14. The exhaust pipe 60 is shown to include a flange 62 which is attached to the rearward exhaust port 17 of the rearward cylinder housing 16.

As best shown in FIG. 2, the exhaust pipe 24 can be attached to each of the exhaust pipes 50 and 60 and can also be attached to each of the exhaust pipes 26 and 28 which are attached to the respective mufflers 30 and 32. In this manner, the exhaust pipe 24 is configured to facilitate passage to the mufflers 30 and 32 of exhaust fluid received by the exhaust pipe 24 from the exhaust pipes 50 and 60. In one embodiment, the exhaust pipe 24 can allow mixing of exhaust fluid received from the exhaust pipes 50 and 60 before passing that exhaust fluid to the mufflers 30 and 32 through the exhaust pipes 26 and 28. In another embodiment, the exhaust pipe 24 can maintain separation of exhaust fluids passing from the exhaust pipe 50 to the exhaust pipe 26, and from the exhaust pipe 60 to the exhaust pipe 28. In either circumstance, the exhaust pipe 24 can comprise a catalytic converter.

The exhaust pipe 50 is shown to have a first flow length which is the travel distance through the exhaust pipe 50 for exhaust fluid moving from the forward exhaust port 15 of the engine 12 to the exhaust pipe 24. The exhaust pipe 60 is shown to have a second flow length which is the travel distance through the exhaust pipe 60 for exhaust fluid moving from the rearward exhaust port 17 of the engine 12 to the exhaust pipe 24. In one embodiment, as shown in the example of FIG. 2, the first and second exhaust pipes 50, 60 can have similar flow lengths which, it will be appreciated, can achieve significant acoustical advantages. For example, by providing exhaust pipes of similar flow length between respective cylinder housings and a common pathway (e.g., provided by the exhaust pipe 24), the audible characteristics of an engine's exhaust can be more regular and acceptable to an operator or bystander of the vehicle.

As the forward cylinder housing 14 and the forward exhaust port 15 are shown in FIGS. 1-2 to be more closely adjacent than the rearward cylinder housing 16 and the rearward exhaust port 17 to the forward end 11 of the motorcycle 10, it will be appreciated that differing minimum lengths of exhaust pipe may be needed to connect the exhaust ports 15 and 17 to a common location. For example, the exhaust pipe 24 is shown to be positioned for receiving the exhaust pipes 50 and 60 at a common location disposed substantially rearwardly of the engine 12. Accordingly, it will be appreciated that the minimum length of exhaust pipe needed to connect the rearward exhaust port 17 and the exhaust pipe 24, in this embodiment, might be shorter than the minimum length of exhaust pipe needed to connect the forward exhaust port 15 and the exhaust pipe 24. To achieve substantially equal flow lengths when differing minimum lengths of exhaust pipe would otherwise be provided, it will be appreciated that at least one of the exhaust pipes will be provided with excess length as compared to the corresponding minimum length. For example, in the example of FIGS. 1-2, the exhaust pipe 60 is shown to have more length than the minimum exhaust pipe length needed to span the distance between the rearward exhaust port 17 and the exhaust pipe 24. As shown in FIGS. 1-2, this additional length of the exhaust pipe 60 can be accommodated by passing the exhaust pipe 60 through the space 20 defined between the cylinder housings 14 and 16. In one embodiment (e.g., as in the example of FIGS. 1-2), the space 20 through which the exhaust pipe 60 extends can be located horizontally between the forward and rearward cylinder housings 14, 16 of the engine 12, above the main block of the engine 12, and below the fuel injection and/or air/fuel intake components of the engine 12.

An imaginary plane (e.g., a portion of which is depicted as "P" in FIG. 2) can centrally bisect the motorcycle 10 such that the imaginary plane is perpendicular to the rotational axis R of the crankshaft 44. It will be appreciated that such an imaginary plane can include the steering axis of the motorcycle 10 and can be perpendicular to a rotational axis of the rear wheel of the motorcycle 10. In the embodiment of FIGS. 1-2, the forward exhaust port 15 and the rearward exhaust port 17 are shown to be disposed upon opposite sides of the imaginary plane. The mufflers 30 and 32 are also shown to be disposed upon opposite sides of the imaginary plane. In other embodiments, respective mufflers and/or respective exhaust ports of an engine might be disposed upon a common side of such an imaginary plane.

Referring again to FIGS. 1-2, the exhaust pipe 60 can cross the imaginary plane when extending through the space 20 such that respective portions of the exhaust pipe 60 are disposed upon opposite sides of the imaginary plane. The exhaust pipe 60 is shown in FIG. 2 to extend generally parallel with the rotational axis R of the crankshaft 44 when extending through the space 20 and, in one embodiment, can do so without the portion of the exhaust pipe 60 that extends through the space contacting either of the cylinder housings 14, 16. The exhaust pipe 50, however, is shown to be at least substantially (i.e., substantially or entirely) disposed upon a single side of the imaginary plane. However, in an alternative embodiment, in which an exhaust pipe is attached to a rearward cylinder housing of an engine and crosses an imaginary plane when passing between adjacent cylinder housings of the engine (e.g., as does exhaust pipe 60 in FIG. 2), another exhaust pipe attached to a forward cylinder housing of the engine might also have significant portions disposed upon both sides of the imaginary plane. In yet another embodiment, it will be appreciated that an exhaust pipe attached to a forward cylinder housing of an engine might cross an imaginary plane when passing between adjacent cylinder housings of the engine and that, in such a configuration, an exhaust pipe attached to a rearward cylinder housing of the engine may or may not have significant portions disposed upon both sides of the imaginary plane.

In one embodiment, it will be appreciated that an engine might be designed so as to optimize the amount and/or configuration of the space (e.g., 20) located between respective cylinder housings of the engine so as to most effectively accommodate passage of an exhaust pipe through the space. For example, with respect to a V-twin engine having a counterbalance shaft, it might be desirable to position the counterbalance shaft within the main block of the engine as forwardly or rearwardly as practically possible with respect to the engine's crankshaft in order to avoid any reduction in the size of the space (e.g., 20) that might otherwise be necessitated by provision of a counterbalance shaft in a more central position in the main block of the engine. For similar reasons, it might also be desirable to locate an engine's water pump on the outside of the engine's housing, or at least as closely to a side wall of the engine's housing as possible. In addition, an engine's cylinder housings can be formed separately from the main block of the engine for attachment to the main block with bolts, thereby simplifying the casting/machining process and potentially reducing any excess bulk in the vicinity of the space (e.g., 20) which might otherwise be necessitated by a process of machining or casting the cylinder housings together with the main block of the engine.

By passing an exhaust pipe (e.g., 60) between respective cylinder housings (e.g., 14, 16) of an engine (e.g., 12), it will be appreciated that the overall layout and compactness of an exhaust system and associated vehicle (e.g., the motorcycle 10) can be optimized. This arrangement is particularly beneficial when involving a vehicle (e.g., a motorcycle) having a V-type engine (e.g., a V-twin engine), as such engines are challenging to provide upon a vehicle in a compact configuration due to their generally non-symmetrical shape. As an additional benefit, by disposing a portion of an exhaust pipe's length between respective cylinder housings (e.g., 14, 16) of a motorcycle's engine, an operator of the motorcycle may more easily be able to avoid inadvertent contact with that exhaust pipe, and potential burns resulting from such contact. Such a configuration can also provide advantages in terms of serviceability of an engine, an exhaust system, and/or other components of a vehicle (e.g., motorcycle 10), and can also provide for improved cooling of an engine and/or components of an exhaust system.

Such a configuration can also facilitate improved overall aesthetics for an exhaust system and an associated vehicle (e.g., a motorcycle). For example, improved aesthetics can be achieved by effectively hiding part of the length of an exhaust pipe between the respective cylinder housings (e.g., 14, 16) of an engine. As another example, referring to the motorcycle 10 described above with reference to FIGS. 1-2, this configuration allows portions of both exhaust pipes 50 and 60 to run alongside one another (e.g., just before entering the exhaust pipe 24) which, it is believed, provides enhanced aesthetic characteristics as compared to separately routing exhaust pipes for forward and rearward engine cylinders exclusively upon respective sides of a motorcycle (i.e., without ever bringing the exhaust pipes together).

While the foregoing makes reference to the motorcycle 10 of FIG. 1, it will be appreciated that any of a variety of other vehicles might be provided with an exhaust pipe extending through a space defined by respective cylinder housings of an engine. Such other vehicles might comprise, for example, an automobile, a truck, a van, a scooter, a recreational vehicle, a watercraft, an aircraft, agricultural equipment, construction equipment, a toy, an all terrain vehicle ("ATV"), a mower, or any of a variety of other vehicles.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A vehicle comprising:
    an engine comprising a first cylinder housing, a second cylinder housing, and a crankshaft, the crankshaft having a rotational axis, the first cylinder housing comprising a first exhaust port, the second cylinder housing comprising a second exhaust port, the first cylinder housing and the second cylinder housing arranged in a V-shape such that a space is defined between the first cylinder housing and the second cylinder housing;
    a muffler;
    a first exhaust pipe attached to the first exhaust port and configured to facilitate passage of exhaust fluid from the first cylinder housing and toward the muffler; and
    a second exhaust pipe attached to the second exhaust port and configured to facilitate passage of exhaust fluid from the second cylinder housing and toward the muffler; wherein
    the second exhaust pipe extends through the space; and
    the second exhaust pipe extends generally parallel with the rotational axis of the crankshaft when extending through the space.

2. The vehicle of claim 1 wherein an imaginary plane centrally bisects the engine perpendicular to the rotational axis of the crankshaft, the first exhaust port and the second exhaust port are spaced from the imaginary plane and are disposed upon opposite sides of the imaginary plane, and the second exhaust pipe crosses the imaginary plane when extending through the space such that respective portions of the second exhaust pipe are disposed upon opposite sides of the imaginary plane.

3. A vehicle comprising:
    an engine comprising a first cylinder housing, a second cylinder housing, and a crankshaft, the crankshaft having a rotational axis, the first cylinder housing comprising a first exhaust port, the second cylinder housing comprising a second exhaust port, the first cylinder housing and the second cylinder housing arranged in a V-shape such that a space is defined between the first cylinder housing and the second cylinder housing;
    a muffler;
    a first exhaust pipe attached to the first exhaust port and configured to facilitate passage of exhaust fluid from the first cylinder housing and toward the muffler; and
    a second exhaust pipe attached to the second exhaust port and configured to facilitate passage of exhaust fluid from the second cylinder housing and toward the muffler, wherein the second exhaust pipe extends through the space; wherein an imaginary plane centrally bisects the vehicle perpendicular to the rotational axis of the crankshaft, the first exhaust port and the second exhaust port are spaced from the imaginary plane and are disposed upon opposite sides of the imaginary plane, and the second exhaust pipe crosses the imaginary plane when extending through the space such that respective portions of the second exhaust pipe are disposed upon opposite sides of the imaginary plane; and the first exhaust pipe is at least substantially disposed upon a single side of the imaginary plane.

4. The vehicle of claim 2 wherein the first cylinder housing is more closely disposed than the second cylinder housing to a forward end of the vehicle.

5. A vehicle comprising:
an engine comprising a first cylinder housing, a second cylinder housing, and a crankshaft, the crankshaft having a rotational axis, the first cylinder housing comprising a first exhaust port, the second cylinder housing comprising a second exhaust port, the first cylinder housing and the second cylinder housing arranged in a V-shape such that a space is defined between the first cylinder housing and the second cylinder housing;
a muffler;
a first exhaust pipe attached to the first exhaust port and configured to facilitate passage of exhaust fluid from the first cylinder housing and toward the muffler; and
a second exhaust pipe attached to the second exhaust port and configured to facilitate passage of exhaust fluid from the second cylinder housing and toward the muffler, wherein the second exhaust pipe extends through the space; wherein
an imaginary plane centrally bisects the vehicle perpendicular to the rotational axis of the crankshaft, the first exhaust port and the second exhaust port are spaced from the imaginary plane and are disposed upon opposite sides of the imaginary plane, and the second exhaust pipe crosses the imaginary plane when extending through the space such that respective portions of the second exhaust pipe are disposed upon opposite sides of the imaginary plane.

6. The vehicle of claim 5 wherein the muffler comprises two mufflers disposed upon opposite sides of the imaginary plane.

7. The vehicle of claim 1 wherein the first exhaust pipe and the second exhaust pipe have similar flow lengths.

8. A vehicle comprising:
an engine comprising a first cylinder housing, a second cylinder housing, and a crankshaft, the crankshaft having a rotational axis, the first cylinder housing comprising a first exhaust port, the second cylinder housing comprising a second exhaust port, the first cylinder housing and the second cylinder housing arranged in a V-shape such that a space is defined between the first cylinder housing and the second cylinder housing;
a muffler;
a first exhaust pipe attached to the first exhaust port and configured to facilitate passage of exhaust fluid from the first cylinder housing and toward the muffler;
a second exhaust pipe attached to the second exhaust port and configured to facilitate passage of exhaust fluid from the second cylinder housing and toward the muffler, wherein the second exhaust pipe extends through the space; and a third exhaust pipe configured to facilitate passage to the muffler of exhaust fluid received by the third exhaust pipe from the first exhaust pipe and the second exhaust pipe.

9. The vehicle of claim 1 wherein the engine comprises a V-twin engine.

10. A motorcycle comprising:
a frame;
a V-twin engine supported with respect to the frame and comprising a forward cylinder housing, a rearward cylinder housing, and a crankshaft, the crankshaft having a rotational axis, the forward cylinder housing comprising a forward exhaust port, the rearward cylinder housing comprising a rearward exhaust port, and the forward cylinder housing and the rearward cylinder housing arranged in a V-shape such that a space is defined between the forward cylinder housing and the rearward cylinder housing; and
an exhaust system supported with respect to the frame and comprising a muffler, a first exhaust pipe, and a second exhaust pipe, the first exhaust pipe being attached to the forward exhaust port and configured to facilitate passage of exhaust fluid from the forward cylinder housing and toward the muffler, the second exhaust pipe being attached to the rearward exhaust port and configured to facilitate passage of exhaust fluid from the rearward cylinder housing and toward the muffler, the first exhaust pipe and the second exhaust pipe having similar flow lengths, wherein an imaginary plane centrally bisects the engine perpendicular to the rotational axis of the crankshaft, the first exhaust port and the second exhaust port are spaced from the imaginary plane and are disposed upon opposite sides of the imaginary plane, and the second exhaust pipe extends through the space such that respective portions of the second exhaust pipe are disposed upon opposite sides of the imaginary plane.

11. A motorcycle comprising:
a frame;
a V-twin engine supported with respect to the frame and comprising a forward cylinder housing, a rearward cylinder housing, and a crankshaft, the crankshaft having a rotational axis, the forward cylinder housing comprising a forward exhaust port, the rearward cylinder housing comprising a rearward exhaust port, and the forward cylinder housing and the rearward cylinder housing arranged in a V-shape such that a space is defined between the forward cylinder housing and the rearward cylinder housing; and
an exhaust system supported with respect to the frame and comprising a muffler, a first exhaust pipe, a second exhaust pipe, and a third exhaust pipe, the first exhaust pipe being attached to the forward exhaust port and configured to facilitate passage of exhaust fluid from the forward cylinder housing and toward the muffler, the second exhaust pipe being attached to the rearward exhaust port and configured to facilitate passage of exhaust fluid from the rearward cylinder housing and toward the muffler, the first exhaust pipe and the second exhaust pipe having similar flow lengths, the third exhaust pipe configured to facilitate passage to the muffler of exhaust fluid received by the third exhaust pipe from the first exhaust pipe and the second exhaust pipe, wherein an imaginary plane centrally bisects the motorcycle perpendicular to the rotational axis of the crankshaft, the first exhaust port and the second exhaust port are disposed upon opposite sides of the imaginary plane, and the second exhaust pipe extends through the space such that respective portions of the second exhaust pipe are disposed upon opposite sides of the imaginary plane.

12. A motorcycle comprising:
a frame;
a V-twin engine supported with respect to the frame and comprising a forward cylinder housing, a rearward cylinder housing, and a crankshaft, the crankshaft having a rotational axis, the forward cylinder housing comprising a forward exhaust port, the rearward cylinder housing comprising a rearward exhaust port, and the forward cylinder housing and the rearward cylinder housing arranged in a V-shape such that a space is defined between the forward cylinder housing and the rearward cylinder housing; and
an exhaust system supported with respect to the frame and comprising a muffler, a first exhaust pipe, and a second exhaust pipe, the first exhaust pipe being attached to the forward exhaust port and configured to facilitate passage of exhaust fluid from the forward cylinder housing and toward the muffler, the second exhaust pipe being attached to the rearward exhaust port and configured to facilitate passage of exhaust fluid from the rearward cylinder housing and toward the muffler, the first exhaust pipe and the second exhaust pipe having similar flow lengths, wherein an imaginary plane centrally bisects the engine perpendicular to the rotational axis of the crankshaft, the first exhaust port and the second exhaust port are disposed upon opposite sides of the imaginary plane, and the second exhaust pipe extends through the space such that respective portions of the second exhaust pipe are disposed upon opposite sides of the imaginary plane;
wherein the second exhaust pipe extends generally parallel with the rotational axis of the crankshaft when extending through the space.

13. A motorcycle comprising:
a frame;
a V-twin engine supported with respect to the frame and comprising a forward cylinder housing, a rearward cylinder housing, and a crankshaft, the crankshaft having a rotational axis, the forward cylinder housing comprising a forward exhaust port, the rearward cylinder housing comprising a rearward exhaust port, and the forward cylinder housing and the rearward cylinder housing arranged in a V-shape such that a space is defined between the forward cylinder housing and the rearward cylinder housing; and
an exhaust system supported with respect to the frame and comprising a muffler, a first exhaust pipe, and a second exhaust pipe, the first exhaust pipe being attached to the forward exhaust port and configured to facilitate passage of exhaust fluid from the forward cylinder housing and toward the muffler, the second exhaust pipe being attached to the rearward exhaust port and configured to facilitate passage of exhaust fluid from the rearward cylinder housing and toward the muffler, the first exhaust pipe and the second exhaust pipe having similar flow lengths, wherein an imaginary plane centrally bisects the motorcycle perpendicular to the rotational axis of the crankshaft, the first exhaust port and the second exhaust port are spaced from the imaginary plane and are disposed upon opposite sides of the imaginary plane, and the second exhaust pipe extends through the space such that respective portions of the second exhaust pipe are disposed upon opposite sides of the imaginary plane.

14. The vehicle of claim 2 comprising a motorcycle.
15. The vehicle of claim 3 comprising a motorcycle.
16. The vehicle of claim 4 comprising a motorcycle.
17. The vehicle of claim 1 comprising a motorcycle.
18. The vehicle of claim 8 comprising a motorcycle.
19. The vehicle of claim 5 comprising a motorcycle.
20. The vehicle of claim 5 wherein the first cylinder housing is more closely disposed than the second cylinder housing to a forward end of the vehicle.
21. The vehicle of claim 5 wherein the engine comprises a V-twin engine.
22. The vehicle of claim 5 wherein the first exhaust pipe and the second exhaust pipe have similar flow lengths.
23. The vehicle of claim 2 wherein the first exhaust pipe and the second exhaust pipe have similar flow lengths.
24. The motorcycle of claim 13 wherein the muffler comprises two mufflers disposed upon opposite sides of the imaginary plane.

* * * * *